F. J. FLEISCHHAUER.
BED PLATE.
APPLICATION FILED APR. 20, 1908.
914,035.
Patented Mar. 2, 1909.
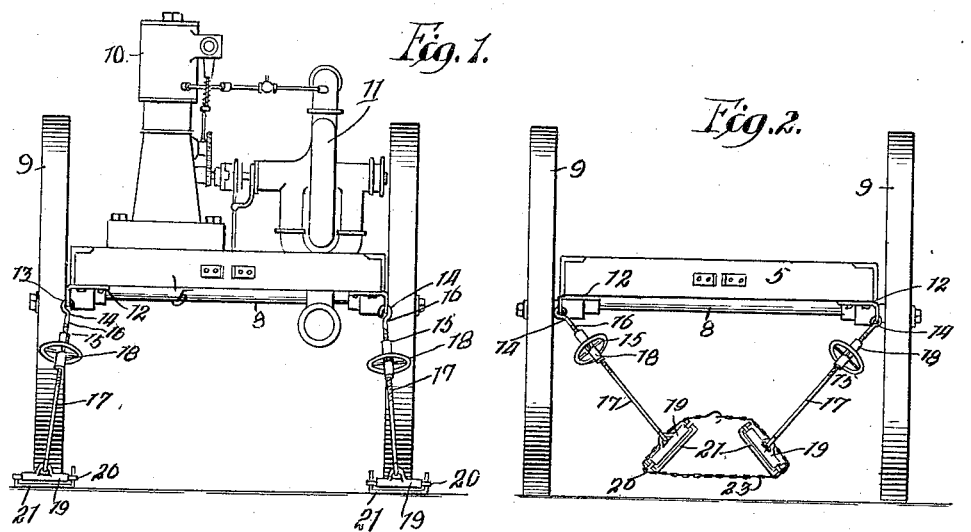
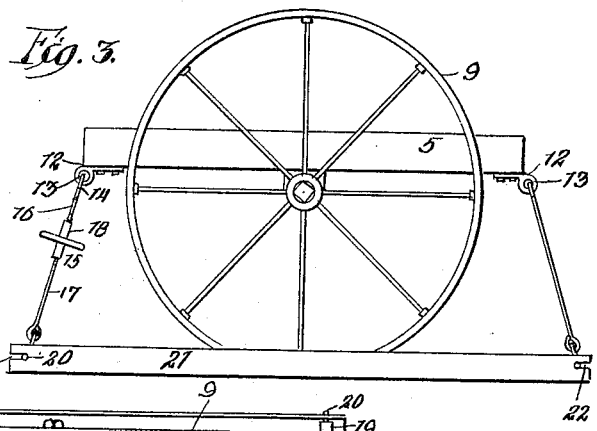
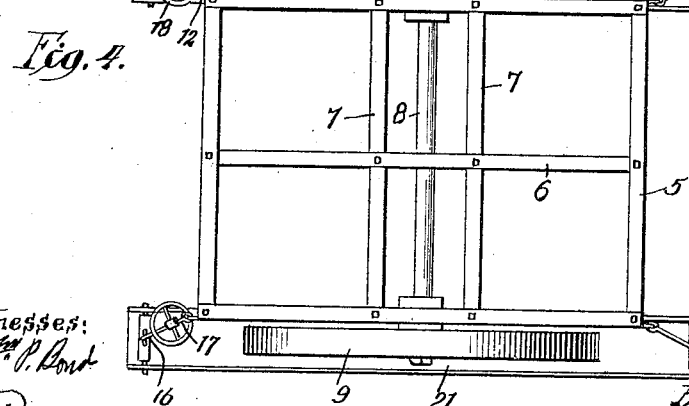
Witnesses:
Inventor:
Frederick J. Fleischhauer
by Banning & Banning
Attys.

UNITED STATES PATENT OFFICE.

FREDERICK J. FLEISCHHAUER, OF CHICAGO, ILLINOIS.

BED-PLATE.

No. 914,035.  Specification of Letters Patent.  Patented March 2, 1909.

Application filed April 20, 1908. Serial No. 428,242.

*To all whom it may concern:*

Be it known that I, FREDERICK J. FLEISCHHAUER, a subject of the Emperor of Germany, residing at Chicago, in the county of Cook and State of Illinois, have invented certain new and useful Improvements in Bed-Plates, of which the following is a specification.

This invention is intended to be used in connection with vehicle structures which ordinarily are subjected to considerable shock and vibration, resulting from and incidental to the use and operation of engines and other active machinery.

It is the primary object of this invention to construct portable bed plates having suitable securing means affixed and depending from the vehicle frame which, when properly adjusted with respect to the portable bed plates, furnish a desirable and effective anchoring means for the vehicle frame, it being further understood that the vehicle can be quickly disengaged from the portable bed plates which, as shown, may be taken up and retained longitudinally beneath the vehicle structure for transportation.

The invention consists in the features of construction and combination of parts hereinafter described and claimed.

In the drawings Figure 1 is an end view of a vehicle carrying a hydrocarbon engine and centrifugal pump secured to the portable bed plates; Fig. 2 an end elevation of the vehicle structure as moved about, the bed plates being fastened to the retainers beneath the vehicle body; Fig. 3 a side elevation of the vehicle structure secured to the bed plates; and Fig. 4 a top or plan view of the device as shown in Fig. 3.

The vehicle structure, as illustrated, comprises a rectangular frame 5 provided with a central longitudinal brace 6 and inner companion transverse supports 7, the frame, as a whole, being mounted upon a vehicle axle 8 as usual, metallic vehicle wheels 9 carrying said structure. The frame 5 is of sufficient strength and size to maintain and carry, for example, a hydrocarbon engine 10 as well as a centrifugal pump 11, as shown in Fig. 1.

A plurality of hangers 12, having eyelets 13, are secured, as indicated, to the various corners of the frame structure, said eyelets, in turn, engaging the upper hooked ends 14 of turn buckles 15 comprising, as shown, upper and lower independent members 16 and 17 respectively, having their meeting ends provided with right and left threads, the members being regulated and adjusted by means of an intermediate movable wheel section 18. The ends of the various lower independent members 17 terminate in and engage locking cross blocks 19 having outwardly projecting studs 20.

A pair of portable bed plates 21 of channel formation having, as shown, slotted ends 22, are adapted to retain thereon the vehicle wheels 9, it being understood that the cross blocks 19 may be locked within the slotted ends 22 of the bed plates. This arrangement permits the turn buckles to rigidly maintain and anchor the vehicle structure in such a manner as that the resultant vibration and shock incident to the use and operation of engines generally, and other active machinery, will be greatly lessened and minimized and creeping prevented.

When it is desired to move the vehicle structure the turn buckles are first loosened, permitting the portable channeled bed plates to be disposed lengthwise under the vehicle frame, as indicated in Fig. 2, the turn buckles being swung inwardly, and a chain 23, or other suitable means, used for locking the same under the vehicle frame.

It will be apparent that the construction herein set forth is especially adapted to anchor the vehicle and to minimize and lessen the vibration and shock incident to the use of active machinery which is mounted upon a vehicle frame in order that the same may be readily transported from place to place.

It is obvious that, instead of having the slots in the ends of the bed plates, that the same may be formed elsewhere without materially changing its construction.

What I claim as new and desire to secure by Letters Patent is:

1. In combination with bed plates having slots, a vehicle frame, and adjustable connecting means having their upper ends secured to the vehicle frame and their lower ends adapted to lock within the bed plates, substantially as described.

2. In combination with a channeled bed plate having end slots, a vehicle frame, turn buckles having their upper ends secured to the vehicle frame, and locking cross blocks secured to the lower ends of the turn buckles the same adapted to be retained within the end slots of the bed plates, substantially as described.

FREDERICK J. FLEISCHHAUER.

Witnesses:
 WALKER BANNING,
 WILLIAM P. BOND.